Aug. 3, 1965　　　H. O. HOLZ　　　3,198,473
MULTIPLE POSITION SEAT
Filed June 18, 1962　　　2 Sheets-Sheet 1

INVENTOR.
Harold O. Holz
BY
Barnard & McGlynn
ATTORNEYS

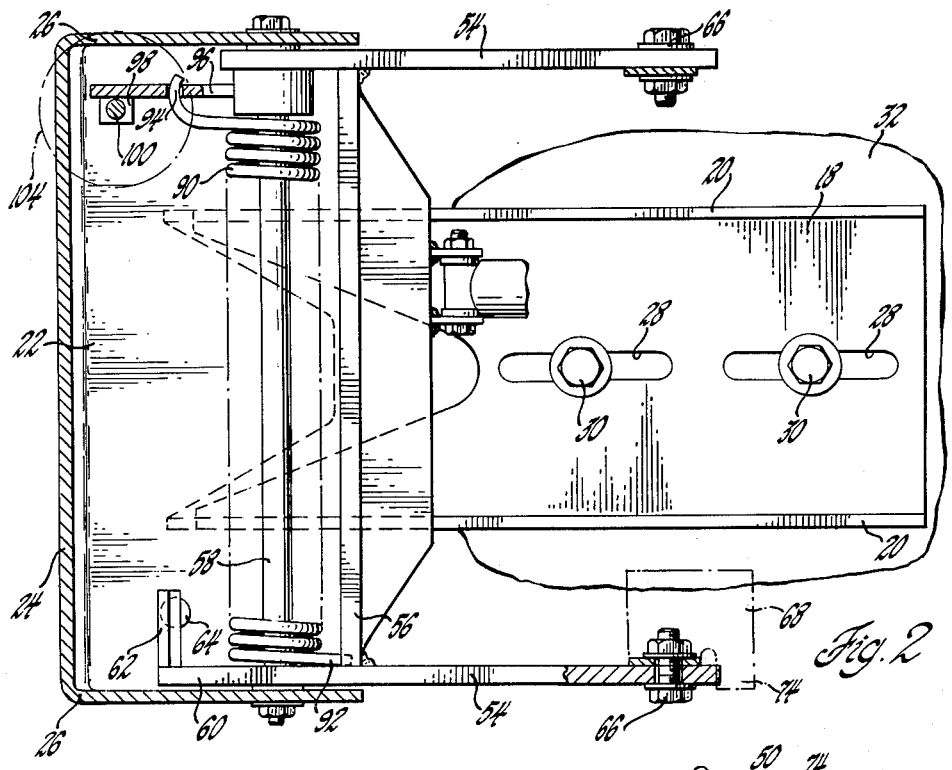

United States Patent Office 3,198,473
Patented Aug. 3, 1965

1

3,198,473
MULTIPLE POSITION SEAT
Harold O. Holz, Linden, Mich., assignor to Massey-Ferguson, Inc., Detroit, Mich., a corporation of Maryland
Filed June 18, 1962, Ser. No. 203,090
17 Claims. (Cl. 248—399)

This invention relates to vehicle seat structures and, more particularly, to a seat structure comprising yieldable suspension means for suspending a body-supporting seat for a predetermined range of cushioned substantially vertical movement in a first seating position thereof, while also functioning to support the seat in a second vertically stationary seating position upwardly and rearwardly from the first seating position thereof.

Certain vehicles in use today, such as agricultural tractors and various types of earth-moving equipment such as self-propelled scrapers, are often operated at relatively great speeds over relatively rough terrain. As a consequence, considerable effort has been devoted to the design of seat structures including yieldable suspension means therefor to provide a cushioned body support and reasonably soft ride for the operators of such vehicles. Since such vehicles may be operated for long periods of time without stopping, it has been found that operator fatigue can be further reduced greatly if the operator is allowed to stand and stretch his legs periodically. In addition, it is often advisable if not necessary for the operator of such vehicles to stand to properly supervise the operation of equipment attached to the vehicle, such as is the case with cultivating or corn picking equipment attached to an agricultural tractor or the bowl including cutting edges, apron and ejector of a self-propelled scraper.

In view of the foregoing considerations, vehicle seat structures have been devised comprising yieldable suspension means including spring means operating through parallelogram-type linkage members to yieldably suspend a seat pan in a first or normal seating position thereof in which the seat pan may rise and fall within a predetermined range of substantially vertical movement in response to various shock loadings on the vehicle and selection of a predetermined loading on the spring means of the suspension in accordance with the weight and desires of the vehicle operator. In one seat structure of this general type, the seat pan has been hingedly connected to the aforementioned suspension means in such a manner as to permit movement of the pan upwardly and forwardly or upwardly and rearwardly from the normal seating position thereof to a non-seating position or, in other words, a position in which the operator may no longer sit normally and comfortably, if at all, in the seat pan, although the latter is thereby moved to a position affording sufficient space on the vehicle for the operator to stand.

In another seat structure of this general type, the seat pan has been movable from its normal seating position to an elevated rearward position in which the operator can continue to sit in it, while also being displaced sufficiently from its normal seating position to provide space for the vehicle operator to stand. However, in some seat structures of this type, auxiliary linkage structure in addition to that utilized to suspend the seat pan in its normal seating position has been required to enable movement of the seat pan from its normal seating position to its second seating position upwardly and rearwardly displaced therefrom. Furthermore, in seat structures of this type the seat pan in the second seating position thereof has continued to be supported by the yieldable suspension means associated therewith with the result that the seat pan is subject to considerable vertical displacement as the vehi-

2 cle traverses irregular terrain, which can be highly undesirable when the vehicle operator occupying the seat pan in the elevated and rearwardly displaced second seating position thereof is called upon to continuously tend and manipulate various controls, and particularly foot-operated controls.

Therefore, the present invention is directed to an improved vehicle seat structure of the type comprising support means adapted to be secured to a vehicle, seat means, and yieldable suspension means including linkage means yieldably suspending and supporting the seat means for a predetermined range of cushioned substantially vertical movement in a first or normal seating position thereof, and particularly characterized by the fact that the yieldable suspension means including the linkage means thereof as aforementioned is operable to permit movement of the seat means to a second substantially vertically stationary seating position above and rearwardly of the first seating position thereof.

More specifically, the aforementioned linkage means of the suspension is particularly characterized by guide links pivotally connected to the support means and the seat means, and a support linkage including a saddle member having one end thereof pivotally connected to the seat means and pivotally connected intermediate its ends to one end each of a pair of laterally spaced rigidly interconnected arm members having the other ends thereof pivotally connected to the support means. The spring means of the suspension is operable on the arm members to provide a cushioned ride in the first seating position of the seat means in which the saddle member underlies and engages the seat means and, in effect, operates as a part of the latter. In moving the seat means to its second seating position, the guide links go overcenter relative to their pivotal connection to the support means while the saddle member pivots away from the seat means and relative to the arm members which remain substantially stationary, the end of the saddle member remote from its pivotal connection to the seat means ultimately engaging the support means to locate the seat means in its stationary second seating position.

The invention is further characterized by stop members cooperable with the guide links and between the saddle member and arm members to positively retain the seat in its second stationary seating position until manually displaced back to the first seating position thereof.

The invention is also characterized by the fact that the aforementioned guide links cooperate with the arm members to form a parallelogram-type linkage system to maintain the seat means substantially horizontal while moving in the first seating position thereof, while the saddle member cooperates with the guide links to form a parallelogram-type linkage system to dispose the seat means substantially horizonal in the second seating position thereof.

For a further description of the invention, reference will now be made to the drawing in which:

FIGURE 2 is a sectional view taken on line 2—2 of FIGURE 1;

FIGURE 4 is a diagrammatic view corresponding to FIGURE 1; and

FIGURE 5 is a diagrammatic view similar to FIGURE 4 but illustrating the seat structure in a second vertically stationary seating position thereof.

Figures 1, 3:
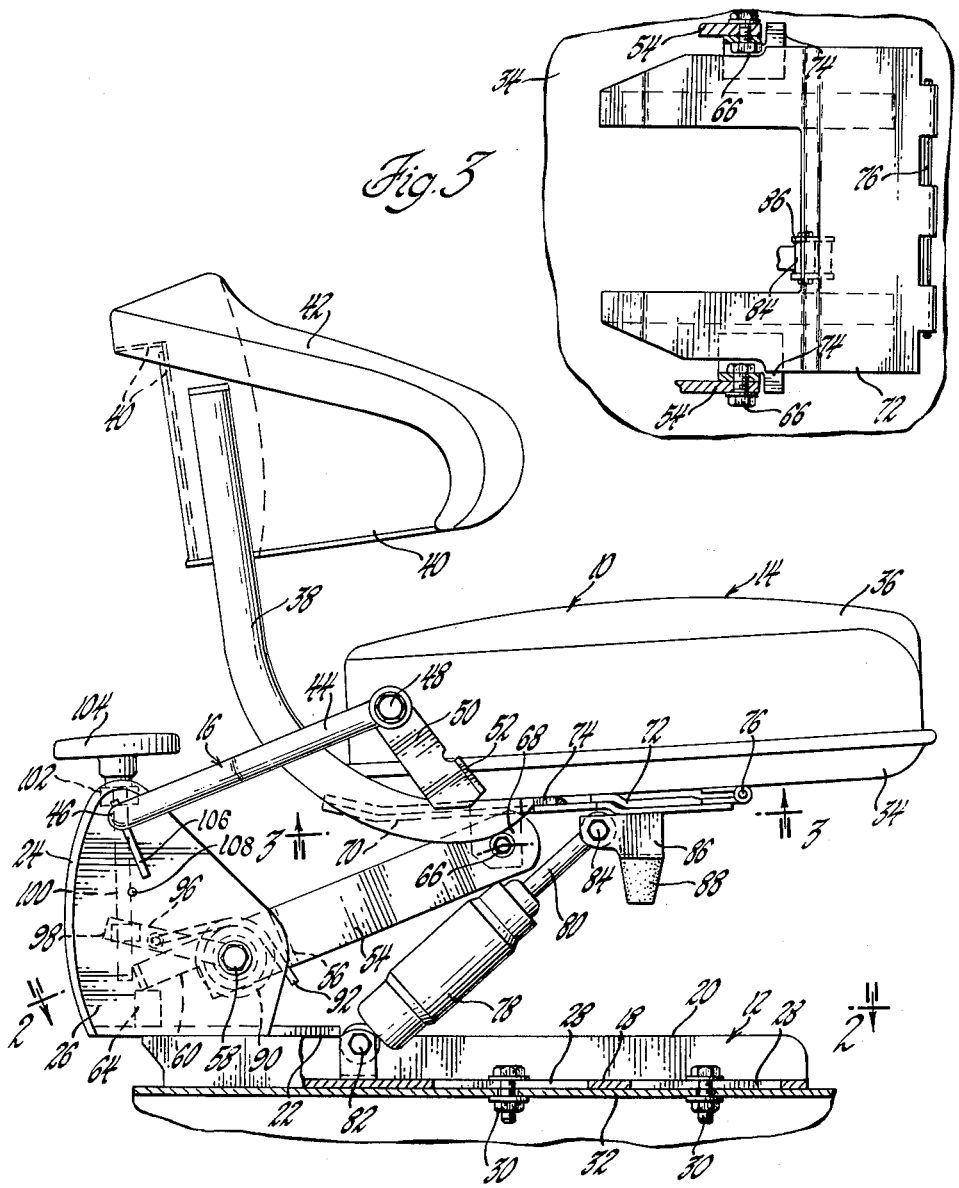
FIGURE 1 is a side elevation of a seat structure illustrating a preferred embodiment of the invention, the seat structure being shown at an upper limit of travel in the first or cushioned seating position thereof.
FIGURE 3 is a fragmentary view, reduced in size, taken on line 3—3 of FIGURE 1.

Referring now to the drawings, and particularly FIGURE 1, the numeral 10 generally indicates a seat structure comprising support means 12, seat means 14 and a suspension mechanism 16 pivotally interconnecting the support means and seat means. More specifically, the support means 12 comprises a channel member 18 including upstanding side flanges 20. The base plate 22 of a housing 24 further including laterally spaced side walls 26 is suitably rigidly secured to the side flanges 20 at one end of the channel member. A pair of elongate slots 28 in the channel member are adapted to receive suitable fastening means 30 carried by a portion of the vehicle as indicated at 32 on which the seat structure is to be mounted, thereby permitting the channel member and the seat structure supported thereon to be adjusted on the vehicle.

The seat means 14 comprises the usual seat pan 34 adapted to receive a cushion member 36, and having the rearward side edges thereof suitably rigidly secured to the lower ends of a pair of arcuately shaped laterally spaced arm members 38. An arcuately curved rigid back rest 40 is suitably rigidly secured between the upper ends of the arm members 38 and is covered with a suitable cushion member 42 which covers not only the forward surface of the back rest but also the upper and side edges thereof as clearly illustrated in FIGURE 1. Accordingly, a completely cushioned support is provided when the vehicle operator is standing beside the seat and rests his hand or leans his elbow on the back rest. It will also be noted that, due to the vertical spacing between the backrest 40 and the seat pan 34 between the laterally spaced arm members 38, an opening is provided through the back of the seat means for ventilation purposes.

The suspension mechanism comprises a pair of guide links 44, one of which is shown in the drawings, each having one end pivotally connected as indicated at 46 to the respective side walls 26 of the housing 24. The other ends of each of the guide links are suitably pivotally connected at 48 respectively to brackets 50, one of which is shown in the drawings rigidly secured as by welding to the rearward side portions of the seat pan 34, each of the brackets including a laterally outwardly projecting stop member or ear 52 for a purpose to be described. A pair of laterally spaced support arm members 54 are rigidly interconnected by the member 56, and one end each thereof is suitably rotatably journaled on the shaft 58 extending through the housing 24 between the side walls thereof, one of the arm members including a rearward extension 60 equipped with a laterally inwardly projecting stop bracket 62 cooperable with a resilient bumper 64 fixed to the base plate 22 within the housing. The upper ends of the respective arm members 54 are suitably pivotally connected at 66 respectively to brackets 68, one of which is shown in the drawings, suitably rigidly secured intermediate the ends of a pair of laterally spaced legs 70 of a saddle member 72, the brackets each including laterally outwardly projecting stop members or ears 74 for a purpose to appear more fully hereinafter. One end of the saddle member 72 is pivotally hinged at 76 to the bottom of the seat pan 34. A conventional vibration dampener including the usual relatively reciprocable members 78 and 80 are each respectively pivotally connected at 82 to the channel member 18 and at 84 to a bracket 86 suitably rigidly secured to the saddle member 70 and mounting thereon a resilient bumper 88.

A torsion spring 90 is disposed about the shaft 58 and has one end 92 abutting the member 56 adjacent its connection to one of the arm members 54, while the other end 94 thereof projects laterally through an aperture formed intermediate the ends of a lever 96 suitably pivotally supported about the shaft 58. The nut 98 is secured to the free end of the lever 96 and threadably receives a lead screw 100 suitably rotatably mounted as by means of a thrust bearing 102 on housing 24 and having its upper end connected to a handle 104 located exteriorly of the housing. As will be apparent from FIGURES 1 and 2, the handle 104 may be rotated in each of two directions to adjust the lever 96 downwardly or upwardly in FIGURE 1 to wind and unwind, respectively, the spring 90 to adjust the tension thereof and degree of support provided for the seat means 14 through the arm members 54. An indicating pin 106 is secured to one of the guide links 44 and is alignable with suitable indicia, in this instance a pin 108 secured to the exterior surface of the corresponding side wall 26 of the housing 24, to indicate when the spring 90 is adjusted with the seat occupied for a correct ride in the positions of FIGURES 1 and 4.

Referring now to the operation of the aforementioned seat structure, it may first be noted that FIGURES 1 and 4 illustrate the seat structure 10 in a first or normal seating position thereof in which the saddle member 72 underlies and directly engages the base of the seat pan 34 and the arm members 54 and guide links 44 form a parallelogram-type linkage to maintain the seat pan substantially horizontal while it rises and falls in a substantially vertical path when occupied in response to shock loads imposed on the vehicle and operation of torsion spring 90. Furthermore, FIGURES 1 and 4 show the seat structure in the extreme upper position of such vertical travel in the first or normal seating position thereof as limited by engagement of the stop bracket 62 with the resilient bumper 64. The seat structure, of course, is automatically disposed in such upper position when it is not occupied as illustrated due to the force of the spring 90 acting on the arm members 54 to continuously urge them counterclockwise in FIGURES 1 and 4. When the seat structure is occupied, abutment of the stop bracket 62 and resilient bumper 64 also acts as a rebound stop limiting rising movement of the seat structure to the positions of FIGURES 1 and 4. On the other hand, abutment of resilient bumper 88 carried on saddle member 72 with channel member 18 limits falling movement of the seat structure to an extreme lower position below that illustrated in FIGURES 1 and 4 as will be readily apparent. Thus, the torsion spring 90, after adjustment thereof to the requirements of a particular operator as aforementioned, yieldably supports and suspends the seat structure 10 through the guide links 44 and arm members 54 forming a parallelogram-type linkage to maintain the seat means 14 in a substantially horizontal position throughout its range of movement in the first or normal seating position thereof. The vibration dampener functions to absorb and dampen shock loadings on the seat means 14 and to prevent the latter from vibrating sympathetically with the vehicle on which it is mounted.

When it is desired to move the seat structure 10 from the position of FIGURES 1 and 4 to the position illustrated in FIGURE 5, the vehicle operator, whether standing on the ground alongside the tractor or more probably standing on the vehicle itself, may push or lift upwardly and rearwardly on the forward edge of the seat pan 34. At this time, the guide links 44 pivot counterclockwise about their pivot connections 46 to housing 24, and saddle member 72 pivots counterclockwise about its pivot connections 66 to arm members 54 and away from the bottom of seat pan 34. In this regard, the guide links and saddle member function substantially as a parallelogram-type linkage to maintain the seat pan substantially horizontal while shifting to the position illustrated in FIGURES 5. Furthermore, to the extent that movement of the seat manually in this manner may tend to pivot the arm members 54 counterclockwise in FIGURES 1 and 4, it will be noted that such movement is prevented by engagement of the stop bracket 62 with the resilient bumper 64.

When the seat pan 34 reaches its second seating position as illustrated in FIGURE 5 above and rearwardly of the first seating position thereof, it will be noted that the pivotal connections 48 of the guide links to the seat means flanges 20 of the channel member 18, the pivotal connections 46 to the housing 24, and the guide links abut the stop members or ears 52. In similar fashion, the saddle member 72 has swung between the arm members 54 until such times as the ends of the leg members 70 thereof are in position to rest on the edges of the side flanges 20 of the channel member 18, the pivotal connection 76 of the saddle member to the seat pan has gone overcenter relative to its pivotal connections 66 to the arm member 54 and the stop members or ears 74 engage the respective arm members 54. Also, as the saddle member moves between its positions illustrated respectively in FIGURES 4 and 5, the legs 70 thereof swing to either side of the vibration dampener.

Thus, in the second seating position of seat means 14, engagement of the guide links 44 with the stop members or ears 52, arm members 54 with the stop members or ears 74 and the engagement of the ends of legs 70 of the saddle member positively with the side flanges 20 of the channel member positively lock and retain the seat means stationary in such position, the torsion spring 90 having no suspension effect in this position. Consequently, not only is standing room provided on the vehicle, but the vehicle operator may ride in the seat means in its elevated and rearwardly displaced second seating position and maintain positive control over various control elements of the vehicle and particularly foot operated control elements thereof. Furthermore, it will be noted that in moving the seat means to the position of FIGURE 5, no change whatsoever is mdae in the setting of the torsion spring 90; that is, upon returning the seat means to the position of FIGURES 1 and 4, the torsion spring will exert the same preselected suspension force through the arm members 54.

When it is desired to return the seat means to its normal or first seating position illustrated in FIGURES 1 and 4, the vehicle operator may lift or push upwardly and forwardly on the seat pan to disengage the lower ends of the legs 70 of the saddle member from the side flanges 20 of the channel member, disengage the aforedescribed stop members of ears 52 and 74 from the guide links 44 and arm members 54, respectively, and initiate pivotal movement of the guide links 44 and saddle member 72 in a direction opposite to that previously described causing the guide links 44 and saddle member 72 to go back overcenter also as previously described. The seat means will then fall automatically to the position of FIGURES 1 and 4 ready again for occupancy and a cushioned ride.

From the foregoing description, it will now be seen that the seat structure of this invention is yieldably suspended in a normal or first seating position in which it is capable of cushioned movement throughout a predetermined range, and may be readily moved to an elevated rearwardly displaced stationary seating position in which it may also be occupied without changing any characteristics of the yieldable suspension mechanism. Furthermore, a seat structure constructed in accordance with this invention is positively locked and retained stationary in such an elevated position and supported therein by the same linkage structure utilized to yieldably suspend the seat in its first or normal seating position.

The embodiments of the invention in which an exclusive property or privilege is claimed as defined as follows:

1. A vehicle seat structure comprising support means adapted to be secured to a vehicle, seat means, and yieldable suspension means including suspension linkage means pivotally connected to said support means and seat means to yieldably suspend the latter in a first seating position thereof, said suspension linkage means being pivotal to move said seat means to a second seating position above and to one side of said first seating position thereof.

2. The vehicle seat structure according to claim 1 in which said yieldable suspension means comprises torsion spring means mounted on said support means, one end of said torsion spring means being engaged with said suspension linkage means, and means cooperable with the other end of said spring means to adjust the tension of the latter.

3. The vehicle seat structure according to claim 1 in which said suspension linkage means comprises guide linkage means pivotally connected to said support means and said seat means, and support linkage means including first and second link means pivotally interconnected and respectively pivotally connected to said support means and said seat means, said guide linkage means and said first link means maintaining said seat means substantially horizontal in said first seating position thereof, said guide linkage means being pivotal relative to said support means and said second link means being pivotal relative to said first link means to move said seat means from said first seating position thereof to said second seating position thereof and to dispose said seat means substantially horizontal in said second seating position thereof.

4. The vehicle seat structure according to claim 3 in which said yieldable suspension means suspends said seat means in said first seating position thereof for movement between extreme upper and lower positions thereof, and further comprising first stop means cooperable between said support means and said seat means to limit movement of the latter to said lower position thereof, and second stop means cooperable between said support means and said first link means to limit movement of said seat means to said upper position thereof, said second stop means preventing pivotal movement of said first link means during movement of said seat means from said first seating position thereof to said second seating position thereof.

5. A vehicle seat structure comprising support means adapted to be secured to a vehicle, seat means, and yieldable suspension means including suspension linkage means pivotally connected to said support means and seat means to yieldably suspend the latter in a first seating position thereof, said linkage means being pivotal to move said seat means to a second seating position stationary above and to one side of said first seating position thereof.

6. The vehicle seat structure according to claim 5 in which said suspension linkage means comprises guide linkage means pivotally connected to said support means and said seat means, and support linkage means including first and second link means pivotally interconnected and respectively pivotally connected to said support means and said seat means, said guide linkage means and said first link means maintaining said seat means substantially horizontal in said first seating position thereof, said guide linkage means being pivotal relative to said support means and said second link means being pivotal relative to said first link means to move said seat means from said first seating position thereof to said second seating position thereof and to dispose said seat means substantially horizontal in said second seating position thereof, said second link means engaging said support means in said second position of said seat means to maintain the latter stationary.

7. A vehicle seat structure comprising support means adapted to be secured to a vehicle, seat means, yieldable suspension means including suspension linkage means pivotally connected to said support means and seat means to yieldably suspend the latter for a range of movement in a first seating position thereof, said linkage means being pivotal to move said seat means to a second seating position above and to one side of said first seating position, and means for retaining said seat means stationary in said second seating position.

8. The vehicle seat structure according to claim 7 in which said suspension linkage means comprises guide linkage means pivotally connected to said support means and said seat means, support linkage means including first and second link means each having one end respectively pivotally connected to said support means and said seat means, means pivotally connecting the other end of said first link means to said second link means intermediate the ends of the latter, said guide linkage means and said first link means maintaining said seat means substantially horizotnal during movement in said first seating position thereof, said guide linkage means being pivotal relative to said support means and said second link means being pivotal relative to said first link means to move said seat means from said first seating position to said second seating position thereof, the other end of said second link means engaging said support means in said second seating position of said seat means.

9. The vehicle seat structure according to claim 7 in which said suspension linkage means comprises guide linkage means pivotally connected to said support means and said seat means, support linkage means including first and second link means each having one end respectively pivotally connected to said support means and said seat means, means pivotally connecting the other end of said first link means to said second link means intermediate the ends of the latter, said guide linkage means and said first link means maintaining said seat means substantially horizontal during movement in said first seating position thereof, said guide linkage means being pivotal relative to said support means and said second link means being pivotal relative to said first link means to move said seat means from said first seating position thereof to said second seating position thereof and to dispose said seat means substantially horizontal in said second seating position thereof, the other end of said second link means engaging said support means and said guide linkage means being disposed overcenter relative to its pivotal connection to said support means in said second seating position of said seat means, and wherein said means for retaining said seat means stationary in said second position thereof comprises stop means engageable with said guide linkage means and said first link means in said second seating position of said seat means.

10. A vehicle seat structure comprising support means adapted to be secured to a vehicle, seat means, suspension linkage means pivotally connected to said support means and seat means, yieldable means operable upon said linkage means to yieldably suspend said seat means for a range of movement in a first seating position thereof, said linkage means being pivotal to move said seat means to a second seating position above and rearwardly of said first seating position thereof, and means for retaining said seat means vertically stationary in said second seating position thereof.

11. The vehicle seat structure according to claim 10 in which said yieldable means comprises torsion spring means mounted on said support means, one end of said torsion spring means being engaged with said suspension linkage means, and manually adjustable means cooperable with the other end of said spring means to adjust the tension of the latter.

12. The vehicle seat structure according to claim 10 in which said suspension linkage means comprises guide linkage means pivotally connected to said support means and said seat means, support linkage means including first and second link means each having one end respectively pivotally connected to said support means and said seat means, means pivotally connecting the other end of said first link means to said second link means intermediate the ends of the latter, said second link means abutting said seat means and said guide linkage means and said first link means maintaining said seat means substantially horizontal during movement in said first seating position thereof, said guide linkage means being pivotal relative to said first link means and said seat means to move the latter from said first seating position thereof to said second seating position thereof and to dispose said seat means substantially horizontal in said second seating position thereof, the other end of said second link means engaging said support means and said guide linkage means being disposed overcenter relative to its pivotal connection to said support means in said second seating position of said seat means, and wherein said means for reaining said seat means vertically stationary in said second seating position thereof comprises stop means carried respectively by said seat means and said second link means and respectively engageable with said guide linkage means and said first link means in said second seating position of said seat means.

13. A vehicle seat structure comprising support means adapted to be secured to a vehicle, seat means, guide linkage means pivotally connected to said support means and said seat means, support linkage means including a saddle member and a pair of laterally spaced rigidly interconnected arm members, means pivotally connected one end of said saddle member and one end of each of said arm members respectively to said seat means and said support means, means pivotally connecting the other ends of said arm members to said saddle member intermediate the ends of the latter, yieldable means operable upon said arm members to yieldably suspend said seat means for a range of movement in a first seating position thereof, said saddle member underlying and engaging said seat means and said guide linkage means and said arm members forming a parallelogram-type linkage to maintain and seat means substantially horizontal during movement in said first seating position thereof, said guide linkage means being pivotal relative to said support means and said saddle member being pivotal relative to said arm members and said seat means to move the latter to a second seating position above and rearwardly of said first seating position thereof, said guide linkage means and said saddle member forming a parallelogram-type linkage to dispose said seat means substantially horizontal in said second seating position thereof, the other end of said saddle member engaging said support means and said guide linkage means being disposed overcenter relative to its pivotal connection to said support means in said second seating position of said seat means, and stop means carried respectively by said seat means and said saddle member and respectively engageable with said guide linkage means and said arm members to retain said seat means in said second seating position thereof.

14. The vehicle seat structure according to claim 13 in which said yieldable means comprises torsion spring means mounted on said support means, one end of said torsion spring means being engaged with said arm members, manually adjustable means cooperable with the other end of said spring means to adjust the tension of the latter, said torsion spring means continuously urging said arm members upwardly, and further comprising stop means engageable with at least one of said arm members to limit upward movement of the latter under the influence of said torsion spring means.

15. The vehicle seat structure according to claim 13 in which said yieldable means suspends said seat means in said first seating position thereof for movement between extreme upper and lower positions thereof, and further comprising first cushioned bumper means cooperable between said support means and said saddle member to limit movement of said seat to said lower position thereof, and second cushioned bumper means cooperable between said support means and at least one of said arm members to limit movement of said seat means to said upper position thereof, said second bumper means preventing pivotal movement of said arm members during movement of said seat means from said first seating position thereof to said second seating position thereof.

16. The vehicle seat structure according to claim 13 in which said saddle member includes laterally spaced leg means at the other end thereof engageable with said support means in said second seating position of said seat means, and further comprising vibration dampening means including relatively reciprocable members respectively reciprocable members respectively pivotally connected to said support means and to said saddle member between the pivotal connections of the latter to said seat means and said arm members, said vibration dampening means extending forwardly of the pivotal connection between said arm members and saddle member with said seat means in said first seating position thereof and being movable between said leg means of said saddle member so as to extend rearwardly of said last-named pivotal connection in said second seating position of said seat means.

17. The vehicle seat structure according to claim 10 further comprising means for indicating a correct ride position for said seat means in said first seating position thereof.

References Cited by the Examiner

UNITED STATES PATENTS

| | | | |
|---|---|---|---|
| 2,257,211 | 9/41 | Willoughby | 248—240.2 X |
| 2,829,703 | 4/58 | Knoedler | 248—378 |
| 2,894,563 | 7/59 | Simons et al. | 248—376 X |
| 2,946,373 | 7/60 | McCause et al. | 248—421 |
| 2,986,199 | 5/61 | Ferreira et al. | 248—429 X |
| 3,006,593 | 10/61 | Plate et al. | 248—376 |
| 3,049,330 | 8/62 | Coons et al. | 248—419 |

FOREIGN PATENTS 897,427  5/44  France.

CLAUDE A. LE ROY, *Primary Examiner.*

UNITED STATES PATENT OFFICE
CERTIFICATE OF CORRECTION

Patent No. 3,198,473                                            August 3, 1965

Harold O. Holz

It is hereby certified that error appears in the above numbered patent requiring correction and that the said Letters Patent should read as corrected below.

Column 4, line 62, for "FIGURES" read -- FIGURE --; line 73, for "flanges 20 of the channel member 18, the" read -- 14 have gone overcenter relative to their --; column 5, line 27, for "mdae" read -- made --; column 6, line 75, for "horizotnal" read -- horizontal --; column 7, line 73, for "reaining" read -- retaining --; column 8, line 10, for "connected" read -- connecting --; column 10, line 3, for "McCause et al." read -- McCanse et al. --.

Signed and sealed this 29th day of March 1966.

(SEAL)
Attest:

ERNEST W. SWIDER                                      EDWARD J. BRENNER
Attesting Officer                                           Commissioner of Patents